United States Patent
Tákacs et al.

(10) Patent No.: US 12,471,590 B2
(45) Date of Patent: Nov. 18, 2025

(54) MOUSE REPELLENTS, DEVICES, AND METHODS OF USING SUCH

(71) Applicant: Gerhard Gries, Coquitlam (CA)

(72) Inventors: Stephen Tákacs, Hope (CA); Gretchen White, Delaware, OH (US); Natalie Chilicki, Hilliard, OH (US); Regine Gries, Coquitlam (CA); Gerhard Gries, Coquitlam (CA)

(73) Assignee: Gerhard Gries, Coquitlam (CA)

( * ) Notice: Subject to any disclaimer, the term of this patent is extended or adjusted under 35 U.S.C. 154(b) by 598 days.

(21) Appl. No.: 17/482,267

(22) Filed: Sep. 22, 2021

(65) Prior Publication Data

US 2022/0087247 A1   Mar. 24, 2022

Related U.S. Application Data

(60) Provisional application No. 63/082,469, filed on Sep. 23, 2020.

(51) Int. Cl.

| | |
|---|---|
| *A01N 65/08* | (2009.01) |
| *A01M 29/12* | (2011.01) |
| *A01N 25/02* | (2006.01) |
| *A01N 31/16* | (2006.01) |
| *A01N 37/20* | (2006.01) |
| *A01N 43/40* | (2006.01) |
| *A01N 65/12* | (2009.01) |
| *A01N 65/22* | (2009.01) |
| *A01N 65/24* | (2009.01) |
| *A01N 65/38* | (2009.01) |
| *A01N 65/44* | (2009.01) |
| *A01P 17/00* | (2006.01) |

(52) U.S. Cl.
CPC ............. *A01M 29/12* (2013.01); *A01N 25/02* (2013.01); *A01N 31/16* (2013.01); *A01N 37/20* (2013.01); *A01N 43/40* (2013.01); *A01N 65/08* (2013.01); *A01N 65/12* (2013.01); *A01N 65/22* (2013.01); *A01N 65/24* (2013.01); *A01N 65/38* (2013.01); *A01N 65/44* (2013.01); *A01P 17/00* (2021.08); *A01M 2200/00* (2013.01)

(58) Field of Classification Search
CPC ............................... A01M 29/12; A01N 37/20
See application file for complete search history.

(56) References Cited

U.S. PATENT DOCUMENTS

| | | | | |
|---|---|---|---|---|
| 8,753,695 | B1* | 6/2014 | Porter | A01N 65/00 424/754 |
| 2005/0008714 | A1* | 1/2005 | Enan | A01N 65/08 424/778 |
| 2009/0130053 | A1* | 5/2009 | Weiser | A01N 65/24 424/84 |
| 2015/0359230 | A1* | 12/2015 | Messina | A01N 65/40 424/731 |
| 2017/0281822 | A1* | 10/2017 | Becker | B05B 12/08 |
| 2018/0303084 | A1* | 10/2018 | Malki | A01N 61/02 |

* cited by examiner

*Primary Examiner* — Kyle A Purdy
(74) *Attorney, Agent, or Firm* — Frost Brown Todd LLP

(57) ABSTRACT

Mouse repellents include one or more plant essential oils or other plant-derived natural compounds. The mouse repellents can be used alone or in combination with mouse attractants. Devices and further methods of using the mouse repellents are also disclosed.

13 Claims, 5 Drawing Sheets

MOUSE REPELLENTS, DEVICES, AND METHODS OF USING SUCH

CROSS-REFERENCE TO RELATED APPLICATIONS

The present application claims the priority benefit of U.S. Provisional Patent App. Ser. No. 63/082,469, filed Sep. 23, 2020, which is hereby incorporated by reference herein.

TECHNICAL FIELD

The present disclosure generally relates to mouse repellents formed from a blend of plant essential oils as well as to devices and methods of using the mouse repellents to repel mice.

BACKGROUND

Mice are global pests. They cause damage by soiling food, spreading allergens, diminishing yields of agricultural crops, serving as reservoirs for disease-causing pathogens, endangering island seabird colonies, and by acting as an invasive species harming indigenous fauna. These many adverse effects have prompted ongoing efforts to trap and poison mice. Such control efforts can be enhanced by repelling, or deterring, mice from specific locations.

SUMMARY

According to one embodiment, a mouse repellent includes one or more plant essential oils or plant-derived natural compounds and a carrier liquid. The one or more plaint essential oils or plant-derived natural compounds disseminate from the carrier liquid.

According to another embodiment, a device for repelling one or more mice includes a heated chamber and a mouse repellent bland transferrable to the heated chamber. The mouse repellent blend includes one or more plant essential oils or plant-derived natural compounds.

According to another embodiment, a method of controlling mice includes dispensing a mouse repellent blend at a at least first location, and attracting mice to at a at least second location. The mouse repellent blend includes one or more plant essential oils or plant-derived natural compounds.

DETAILED DESCRIPTION

Figure 1:
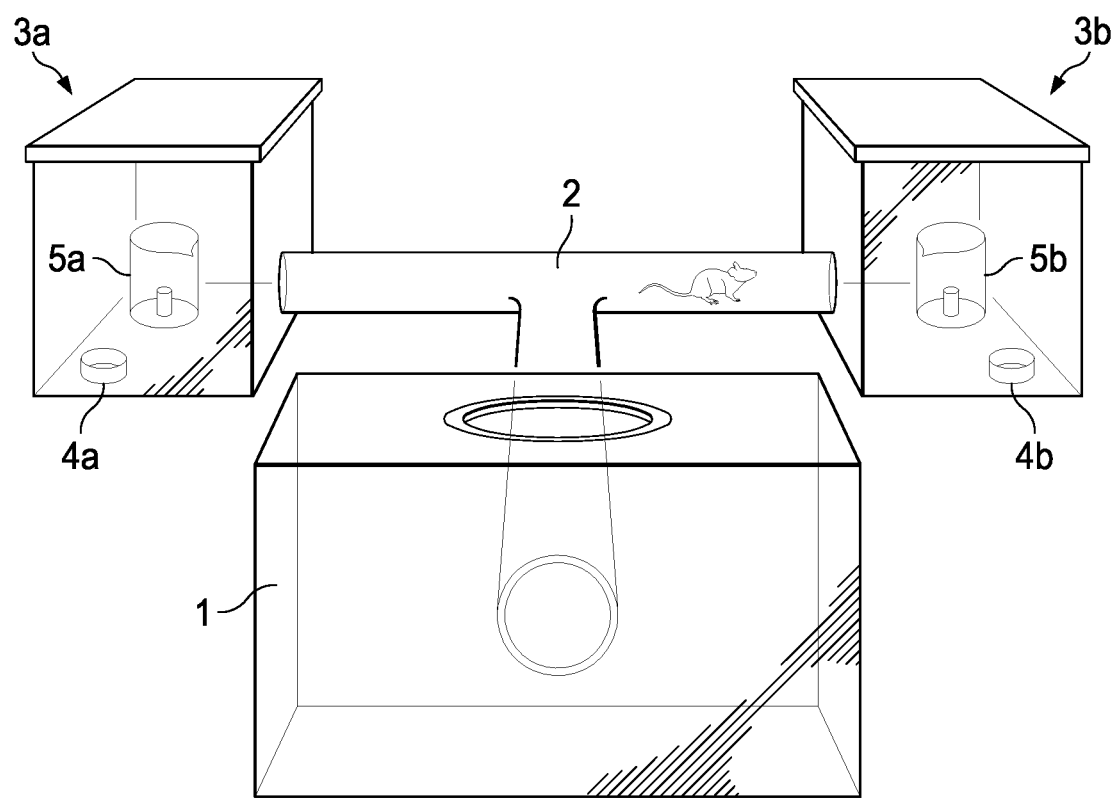
FIG. 1 depicts an illustration of an olfactometer used to test the choice entry of mice to enter a chamber scented with certain mouse repellents or left unscented (control).

The term "odorants" as used herein refers to chemicals which rapidly emanate from a source and are readily sensed by a mouse distant to the source.

The term "isolated" as used herein means separated from materials with which the compound is normally associated in a native state.

The term "purified" as used herein refers to material that has been isolated under conditions that reduce, or eliminate, the presence of unrelated materials, i.e., contaminants, including native materials from which the material is obtained. Purified materials, substantially free of contaminants, can be 50% or more pure; 90% or more pure, or 99% or more pure. Purity can be evaluated by methods known in the art.

The term "synthetic" as used herein means artificially produced by chemical processes or other processes initiated by human activity, as opposed to compounds formed by natural processes.

The term "mouse" as used herein refers to at least one mouse species of the genus *Mus*, including the house mouse (*Mus musculus*), and to at least one mouse species of the genus *Peromyscus*, including the deer mouse (*Peromyscus maniculatus*).

The term "repellent" as used herein refers to any compositions, blends or formulations that repel, or deter, a mouse or mice, from a habitat, food source or other site which may otherwise be frequented or traversed by a mouse or mice.

The term "attractant" as used herein refers to any compositions, blends or formulations that make attractive to a mouse or mice, a habitat, food source or other site which may be frequented or traversed by a mouse or mice.

The present disclosure generally relates to mouse repellents for repelling, or deterring, one or more mice. Generally, the mouse repellents can include one or more plant essential oils that can act to deter at least house mice, *Mus musculus domesticus*, and deer mice, *Peromyscus maniculatus*. In certain embodiments, the mouse repellents can include a blend of three or more plant essential oils. In certain embodiments, the mouse repellents can additionally, or alternatively, include one or more of piperin, capsaicin, cayenne peppers, chili peppers, and black peppers. The present disclosure further relates to devices that facilitate the controlled release of the mouse repellents as well as to mouse control strategies including the use of the present mouse repellents in combination with food and/or pheromone-based attractants.

As will be appreciated, the mouse repellents described herein can exhibit advantageous properties compared to conventional mouse repellents such as toxic chemicals or ultrasonic repellents which are relatively ineffective. The present mouse repellents exhibit excellent repellent, or deterrent, effects on mice while also exhibiting desirable safety attributes.

For example, the present mouse repellents can repel, or deter, mice over a distance of about 10 meters or more, about 7 meters or more, about 5 meters or more, about 3 meter or more, or about 1 meter or more. Using the present mouse repellents, mice can even be deterred from entering locations containing a highly attractive food source.

As can be appreciated, the desirable safety attributes of the present mouse repellents are due to the safety of the plant essential oils and other plant-derived natural compounds (e.g., piperin, capsaicin, cayenne peppers, chili peppers, and black peppers). Plant essential oils are labeled as Generally Recognized As Safe ("GRAS") by the Food and Drug Administration ("FDA") and are used as, or in, food additives, flavoring agents, cosmetics, soaps, perfumes, plastics and resins. Such safety attributes minimize concerns associated with the use of the present mouse repellents. Additionally, the use of the present plant essential oils as mouse repellents not only repel mice but also serve as a pleasant-smelling fragrance to humans.

Plant essential oils are well known and refer to compositions containing volatile odorants extracted from raw plant sources such as inflorescences, leaves, wood, bark, roots, seeds, or peels of various plants. Although typically pleasant-smelling to humans, it was theorized that plant essential oils could be effective to repel mice because these oils are volatile secondary plant metabolites that, among other roles, act as a plant's chemical defense against vertebrate and invertebrate herbivory.

Generally, suitable plant essential oils can be extracted using various processes depending on the essential oil. For example, plant essential oils of lavender, peppermint, tea tree oil, patchouli, and eucalyptus can be extracted using a distillation process while citrus peel oils can be obtained using a pressing process. As can be appreciated however, there are other known extraction methods such as solvent extractions. The plant essential oils for the present mouse repellents can generally be extracted in any suitable fashion and are not limited to any particular production method. In certain embodiments, the plant essential oils can be isolated, purified, or synthetic.

In certain embodiments, certain constituents of plant essential oils can additionally, or alternatively, be used as a component of the present mouse repellents. Examples of such derivatives can include eugenol. Eugenol is a major constituent (greater than 85%) of clove oil and is known to be repellent to mosquitoes, beetles, and termites. As used herein, plant essential oils include constituents of other plant essential oils.

In certain embodiments, the plant essential oils can be selected from one or more of cinnamon bark, cinnamon leaf, geranium, lemongrass, licorice root, spearmint, peppermint, red thyme, wintergreen, and eugenol. As can be appreciated, such plant essential oils have desirable safety attributes including GRAS recognition from the FDA and exemption from registration as a pesticide by the Environmental Protection Agency ("EPA").

In certain embodiments, the present mouse repellents can include a blend of two or more plant essential oils. Blending of multiple plant essential oils is believed to enhance the repellency effect of each such individual plant essential oil by supplementing and complementing the specific deterrent effect of each of the plant essential oils. For example, peppermint has a strong initial deterrent effect; lemongrass, red thyme, and menthol discourage initial eating of a food bait by mice; and cinnamon leaf, lemongrass, and peppermint discourage extended eating of a food bait by mice. The compounding effect of multiple plant essential oils can improve the overall deterrent effect of the present mouse repellents.

In certain embodiments, mouse repellents can include a blend of three plant essential oils or other plant-derived natural compounds (e.g., piperin, capsaicin, cayenne peppers, chili peppers, and black peppers). For example, in certain embodiments, a mouse repellent as described herein can include a blend of peppermint, lemongrass, and cinnamon leaf plant essential oils. In such embodiments, each of the plant essential oils can be included in various ratios with the other plant essential oils or other plant-derived natural compounds. For example, each of the plant essential oils can be included in a 1:1:1 volume or weight ratio, whereas in other embodiments, the volume or weight ratios can be varied such as an about 1.5:1:1 ratio. Generally, each plant essential oil in an arbitrary blend of any number of plant essential oils or other plant-derived natural compounds can be included in a volume or weight ratio of about 0.1 to about 10 to each other plant essential oil or plant-derived natural compound.

The present plant essential oils can passively volatilize or be actively dispensed in order to deter mice. Generally, the mouse repellents described herein can be formulated in any suitable fashion to facilitate such passive volatilization or active dissemination. For example, the mouse repellents can be soaked into, or on, a medium such as filter paper for volatilization or be actively dispensed using a dispensing mechanism. As can be appreciated, the types of media that the mouse repellents can be soaked into, or on, can vary widely. For example, the mouse repellents can be soaked into papers, beddings, insulation material, and sponges in various embodiments. In other embodiments, the mouse repellents can be directly sprayed onto areas, where mouse infestation is problematic such as electrical wires, pipes, and walls. As can be appreciated, the duration and intensity of the repellent effect can vary depending upon the type of dispensing medium selected.

In certain embodiments, the mouse repellent can also, or alternatively, be formulated as a granule, a solid block, a gel, a powder, a paste, a liquid, an aerosolized composition, or as combinations thereof. As can be appreciated, the mouse repellents described herein can be applied in any suitable manner. For example, the mouse repellents can be applied as a liquid, or as an aerosol, using appropriate devices.

In certain embodiments, it can be useful to disseminate the mouse repellents from a device. As can be appreciated, a device can be useful to effectively control the rate of dissemination, to disseminate greater quantities of the mouse repellents, and to increase the amount of mouse repellents that is available for dissemination, thereby extending the longevity of the repellent effect. Additionally, a device provides the option, for example, to insert a new repellent-filled cartridge or to refill an empty cartridge or reservoir.

In certain embodiments, a device engineered to disseminate the mouse repellents can include a reservoir to store the mouse repellents and one or more mechanisms to disseminate the repellents into the surrounding environment. For example, in certain embodiments, the reservoir can be a heated to a temperature suitable for efficient or controlled volatilization of the plant essential oils. In such embodiments, the desired temperature of the reservoir can be obtained by chemical reactions (e.g., through reaction of iron-containing compositions with air, recrystallization of a supersaturated sodium acetate composition, etc.) or by electrical energy (e.g., through attachment to a battery, solar panel, or a plug-in connection to the power grid), thereby heating the mouse repellents to a suitable temperature such as a temperature of about 40° C.

As can be appreciated, variations to such devices are contemplated. For example, suitable devices can alternatively include separate reservoirs and heated chambers in certain embodiments. In such embodiments, capillary action or wicks can be used to transfer the mouse repellents into the heated chamber for volatilization. Additionally, or alternatively, a device can include a fan to physically dispense the mouse repellent through powered air flow.

In certain embodiments, the mouse repellents can be disseminated using multiple methods simultaneously. For example, it can be useful to disseminate the mouse repellents from specific objects and areas such as electrical wires, pipes, insulation, and floorboards while also, more generally, disseminating the mouse repellents from a device to more generally deter mice from the entire area.

In certain embodiments, the mouse repellents described herein can be modified to include additional components such as other deterrents, bittering compounds, colorants, and rheology modifiers.

In certain embodiments, examples of other deterrents can include one or more of ammonium, capsaicin, or piperin. As can be appreciated, capsaicin and piperin can be sourced from natural compounds including cayenne peppers, chili peppers, and black peppers. In certain embodiments, bittering compounds, such as denatonium benzoate, can be included to render the mouse repellents unpalatable to both humans and animals.

In certain embodiments, the mouse repellents can be colored through inclusion of a colorant. For example, dyes and pigments as known in the art can be used to color the mouse repellents. In certain embodiments, colorants can be used to color the compositions a color, such as red, that provides visual warning to humans that the composition has a potentially unpalatable taste. In certain embodiments, colorants can alternatively color a composition to a natural color.

The present mouse repellents can be particularly effective to control mice when used in combination with mouse attractants. For example, a combination of the present mouse repellents with a mouse attractant composition can operate as a "push-pull" system that repels mice from certain locations while attracting mice to other specific locations. Such systems can prevent hungry mice from overcoming the deterrent effect of the mouse repellents by attracting these mice to specific locations where they can be captured in, for example, baited traps.

As can be appreciated, the "push-pull" combination of the present mouse repellents and mouse attractants offer numerous advantages. For example, the mouse repellents can be placed in locations where the infestation of mice are particularly problematic, such as food storerooms, electric panels, water pipes, and building framing, while allowing for captures of mice in locations such as outside where mice can do less damage. In certain embodiments, the present mouse repellents can be used to continuously deter mice from entering a building while mouse attractant compositions, outside of buildings, are used to capture and control mouse populations. As can be further appreciated, the "pull" side of this strategy can control mice in any suitable fashion including but not limited to the use of traps, chemosterilants, toxicants, lethal agents, etc.

Suitable traps can be immobilizing traps (e.g., sticky traps or chamber traps), impaling traps, snap traps, asphyxiation traps (e.g., drowning traps, or noose-based traps), electrocution traps, skull-fracturing piston traps, catch-and-release traps, self-resetting traps capable of multiple killings, or combinations thereof.

Suitable lethal agents can be a chemical that is capable of causing immobilization and/or death of one or more mice. For example, the chemical can be one or more of an anticoagulant and/or a toxicant. In certain embodiments, examples of suitable lethal agents can include warfarin ((RS)-4-hydroxy-3-(3-oxo-1-phenylbutyl)-2H-chromen-2-one), chlorophacinone (2-[2-(4-chlorophenyl)-1-oxo-2-phenylethyl]indane-1,3-dione), diphacinone (2-(diphenylacetyl)-1H-indene-1,3(2H)-dione), bromadiolone (3-[3-[4-(4-bromophenyl)phenyl]-3-hydroxy-1-phenylpropyl]-2-hydroxychromen-4-one), difethialone (3-[3-[4-(4-bromophenyl)phenyl]-1-tetralinyl]-2-hydroxy-4-thiochromenone), brodifacoum (3-[3-[4-(4-bromophenyl)phenyl]-1,2,3,4-tetrahydronaphthalen-1-yl]-2-hydroxychromen-4-one), and combinations thereof. In certain embodiments, suitable toxicants can include bromethalin (N-methyl-2,4-dinitro-6-(trifluoromethyl)-N-(2',4',6'-tribromophenyl)aniline), cholecalciferol ((3β,5Z,7E)-9,10-secocholesta-5,7,10(19)-trien-3-ol), zinc phosphide (zinc phosphide/trizinc diphosphide), strychnine (strychnidin-10-one), alphachloralose, and combinations thereof.

Suitable chemosterilants can be a chemical that is capable of sterilizing one or more mice. For example, suitable chemosterilant chemicals can generally be compounds that can sterilize female mice, or male mice, as known in the art.

In embodiments where the present mouse repellents are used in combination with mouse attractants, generally any known mouse attractant, such as a food bait, can generally be utilized with the present disclosure. In certain embodiments, the mouse attractant can be a chemical or pheromonal attractant composition such as those described in PCT App. No. WO 2017/181290 A1, PCT App. No. WO 2017/201614 A1, PCT App. No. WO 2019/210423 A1, and U.S. Provisional Patent App. Ser. No. 63/066,716 each of which are incorporated herein by reference in their respective entireties.

Although the present mouse repellents have been described for their deterrent effect on mice, similar deterrent properties can also be observed on other animals and rodents such as rats, squirrels and packrats.

EXAMPLES

Source and Maintenance of the Mouse Colonies

Female house mice, *Mus musculus* (strain: CD-1®), were obtained from Charles River Laboratories Ltd (Saint-Constant, QC J5A 2E7, Canada) and cared for by Animal Care Services of Simon Fraser University ("SFU"). On arrival, mice were assigned to four groups of five female mice each. Each group was accommodated in cages (50 cm×40 cm×20 cm) lined with commercial corn cob bedding (Anderson's Bed o'cobs, The Andersons Inc. Maumee, OH 43537, USA), provided with Nalgene toys, running wheels (Jamieson's Pet Food Distributors, Ltd, Delta, BC V4G 1C9, Canada), and provisioned with commercial rodent food (LabDiet® Certified Rodent Diet, LabDiet®, St Louis, MO 63144, USA) as well as water ad libitum. Cages were maintained at a temperature of 21° C. and a relative humidity of 50%. A reverse photoperiod (12 hours light; 12 hours dark) was maintained to facilitate behavioral bioassays during normal working hours.

Plant Essential Oils

Table 1 depicts the names and sources of the plant essential oils evaluated in Examples 1 to 15.

TABLE 1

| Essential Oil | Form | Supplier [place of origin] |
|---|---|---|
| Cinnamon bark | liquid | Liberty Natural Products ("LNP") (Oregon City, OR 97045, USA) [Sri Lanka] |

TABLE 1-continued

| Essential Oil | Form | Supplier [place of origin] |
|---|---|---|
| Cinnamon leaf | liquid | LNP [Sri Lanka] |
| Geranium | liquid | LNP [China] |
| Lemongrass | liquid | LNP [India] |
| Licorice root | liquid | LNP [USA] |
| Spearmint | liquid | LNP [USA] |
| Peppermint | liquid | LNP [USA] |
| Red thyme | liquid | LNP [Morocco] |
| Wintergreen | liquid | LNP [China] |
| Menthol | crystal | LNP [India] |
| (Eugenol) | liquid | Sigma-Aldrich Canada (Oakville, Ontario, Canada) |
| (Vanillin) | crystal | Sigma-Aldrich Canada |

Experiments 1 to 14: T-Tube Olfactometer Bioassays to Test the Ability of Select Plant Essential Oils to Deter Mice from Approaching and Feeding on a Food Bait.

To evaluate whether plant essential oils tested singly or in combinations can deter mice from approaching and feeding on a food bait, laboratory two-choice T-tube olfactometer experiments were performed. The olfactometer is depicted in FIG. 1 and consisted of three clear Plexiglas chambers (1: 40 cm×20 cm×30 cm; 3a and 3b: each 60 cm×30 cm×40 cm) interconnected by a Pyrex glass T-tube (2; stem: 65 cm long, side arms: 45 cm long, all 10 cm in diameter). A food bait was placed in each of the two lateral chambers (3a, 3b), one of which was scented with a plant essential oil or blend of oils. Experiments 1-14 were designed to determine whether singly-tested female mice avoid entering and feeding in the chamber scented with a plant essential oil or blend of oils. The plant essential oils tested in Experiments 1 to 14 are listed in Table 2.

TABLE 2

| Experiment | Formulation |
|---|---|
| 1 | 100 μl Cinnamon bark and food bait |
| 2 | 100 μl Cinnamon leaf and food bait |
| 3 | 100 μl Eugenol and food bait |
| 4 | 100 μl Geranium and food bait |
| 5 | 100 μl Lemongrass and food bait |
| 6 | 100 μl Licorice root and food bait |
| 7 | 100 μl Spearmint and food bait |
| 8 | 100 μl Peppermint and food bait |
| 9 | 100 μl Red thyme oil and food bait |
| 10 | 100 μl Wintergreen and food bait |
| 11 | 100 mg Menthol and food bait |
| 12 | 100 mg Vanillin and food bait |
| 13 | 100 μl Peppermint and food bait |
| 14 | Cinnamon leaf, lemongrass, peppermint (1:1:1 ratio; 100 μl total), and food bait |

In each of Experiments 1 to 14, bioassays were run during each mouse's scotophase in a room illuminated by a 20-W red bulb to facilitate behavioral observations. Following 5 minutes of acclimation, the Plexiglas gate of the release chamber (1 in FIG. 1) was opened, allowing the mouse to enter the stem of the T-tube (2 in FIG. 1) in response to test stimuli randomly assigned to one of the two lateral chambers (3a, 3b in FIG. 1). Liquid test stimuli (mainly the plant essential oils; 100 μl each; Table 2) were pipetted, and solid test stimuli (vanillin, menthol; 100 mg each) were placed, on a fresh cotton ball in a watch glass (3 cm diameter) adjacent to a food bait (1 g) identical to the food bait described in PCT Patent App. No. PCT/CA2017/050498. The results of Experiments 1 to 12 are depicted in FIGS. 2 and 3.

Figure 2:
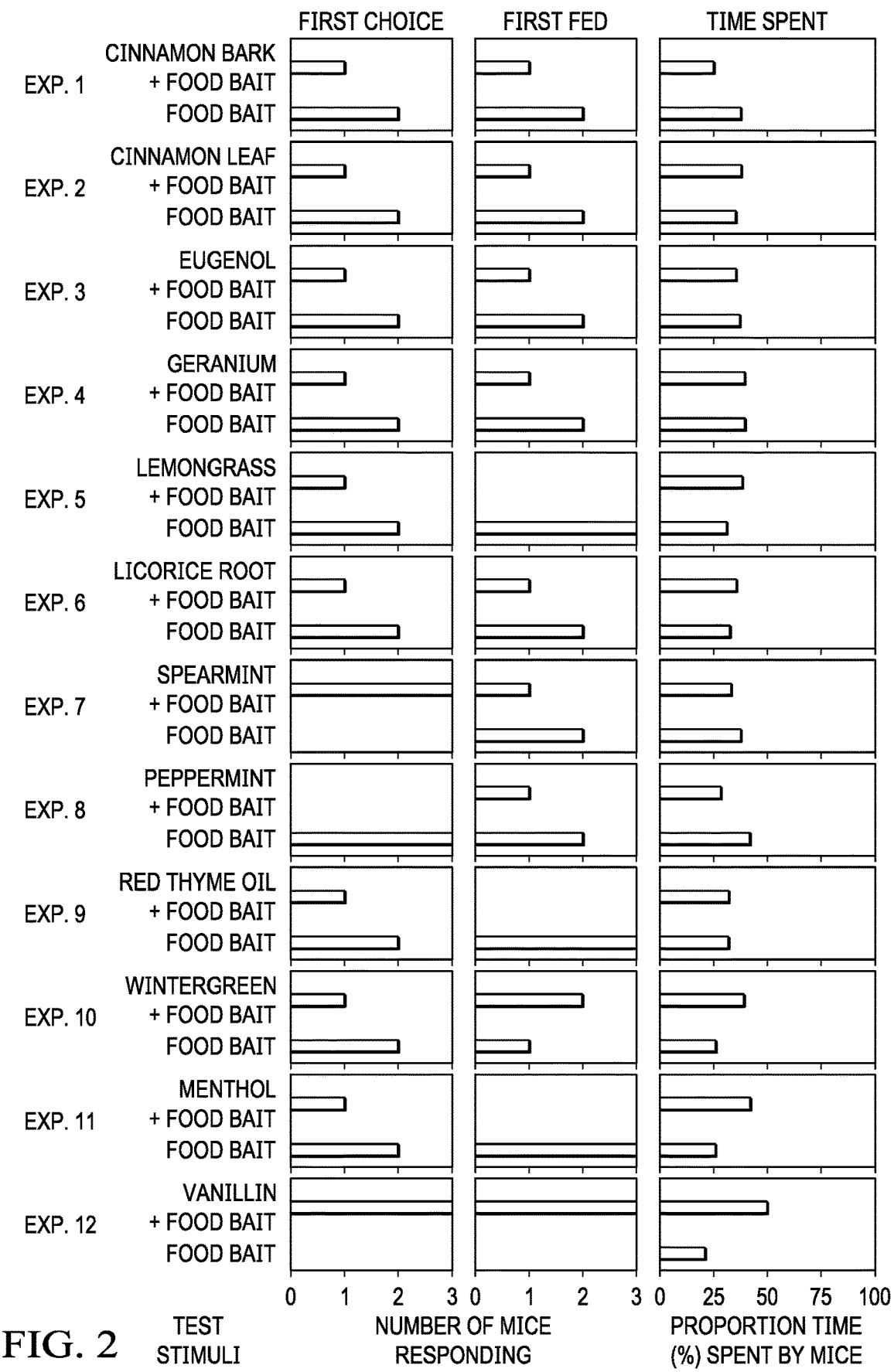
FIG. 2 depicts the first-choice, first-fed, and time-spent data for female mice given the choice of a chamber scented with certain mouse repellents versus a chamber not scented.

FIG. 2 specifically depicts the results of pre-screening experiments (Experiments 1 to 12) with 3 replicates each. The data show the number of females that entered first ("first choice"), and fed in first ("first fed"), the treatment chamber or the control chamber. The data also show the proportion of time females spent ("time spent") in each of the two chambers.

Figure 3:
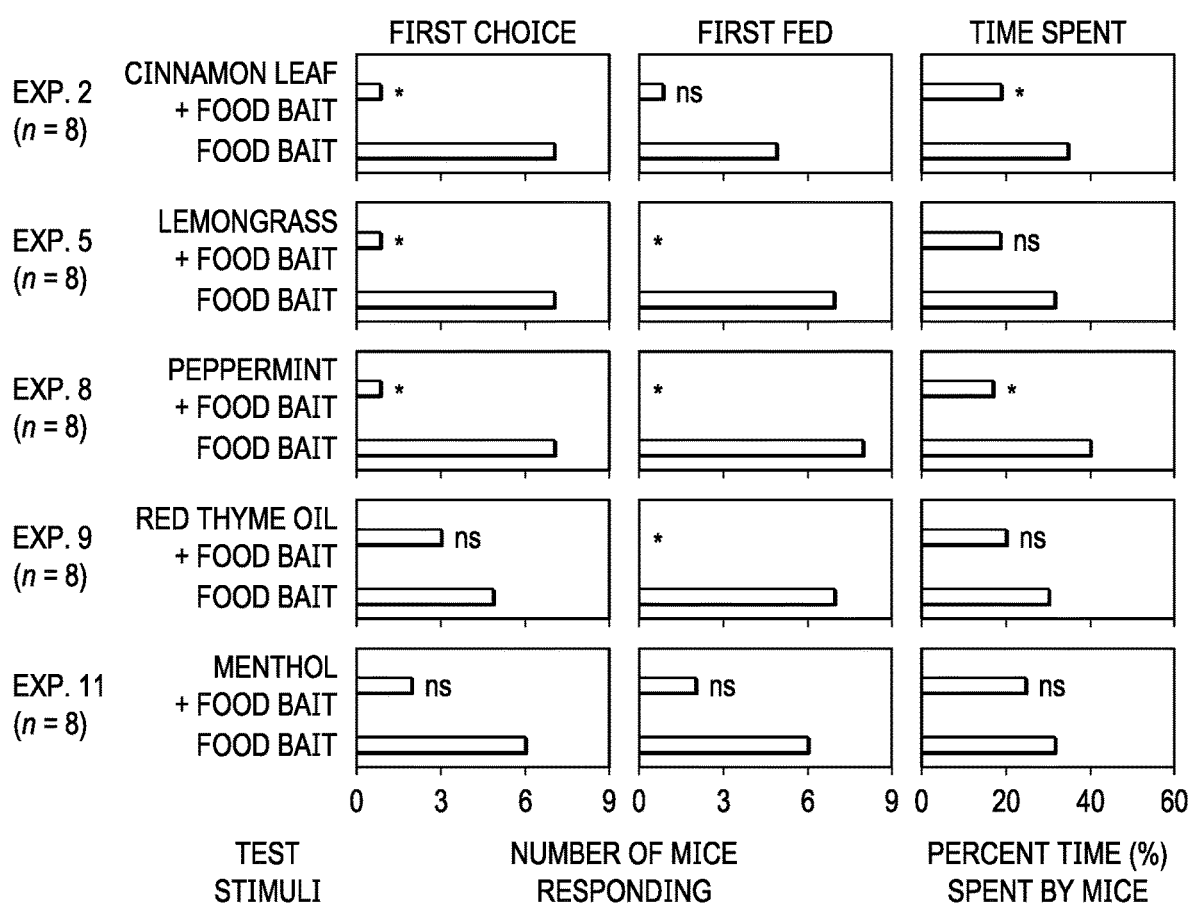
FIG. 3 depicts the first-choice, first-fed, and time-spent data for female mice responding to the choice of a chamber scented with certain mouse repellents versus a chamber not scented.

FIG. 3 depicts data obtained by additional testing of those plant essential oils found most promising in pre-screening experiments (Experiments 2, 5, 8, 9, and 11), running a total of 8 replicates for each of experiments 2, 5, 8, 9 and 11. First-choice, first-fed, and time-spent data were analyzed using g-tests and Student's t-tests, respectively, for these experiments. An asterisk (*) denotes a significant behavioral effect (P<0.05) caused by the test stimulus.

Experiments 1 to 12 indicated that no single plant essential oil was fully effective to deter mice. Chambers scented with peppermint were never entered first by mice, and chambers scented with lemongrass, red thyme or menthol were never fed in first by mice, but no plant essential oil individually markedly reduced the time mice spent in the plant essential oil-scented chamber. Moreover, it was observed that mice never handled cotton balls treated with cinnamon leaf, lemongrass, or peppermint oil.

Based on the extended data set of Experiments 2, 5, 8, 9, and 11 (8 instead of 3 replicates each), peppermint (100 μl) and a ternary blend of peppermint, cinnamon leaf, and lemon grass (1:1:1 ratio; 100 μl total) were selected for additional testing in Experiments 13 and 14, respectively. The experimental protocol of Experiments 13 and 14 closely resembled that of Experiments 1 to 12. Six replicates were ran for each of Experiments 13 and 14, and the data were analyzed using g-tests and Student's t-tests. The results are depicted in FIG. 4, with an asterisk (*) denoting a significant behavioral effect (P<0.05) caused by the test stimulus.

Figure 4:
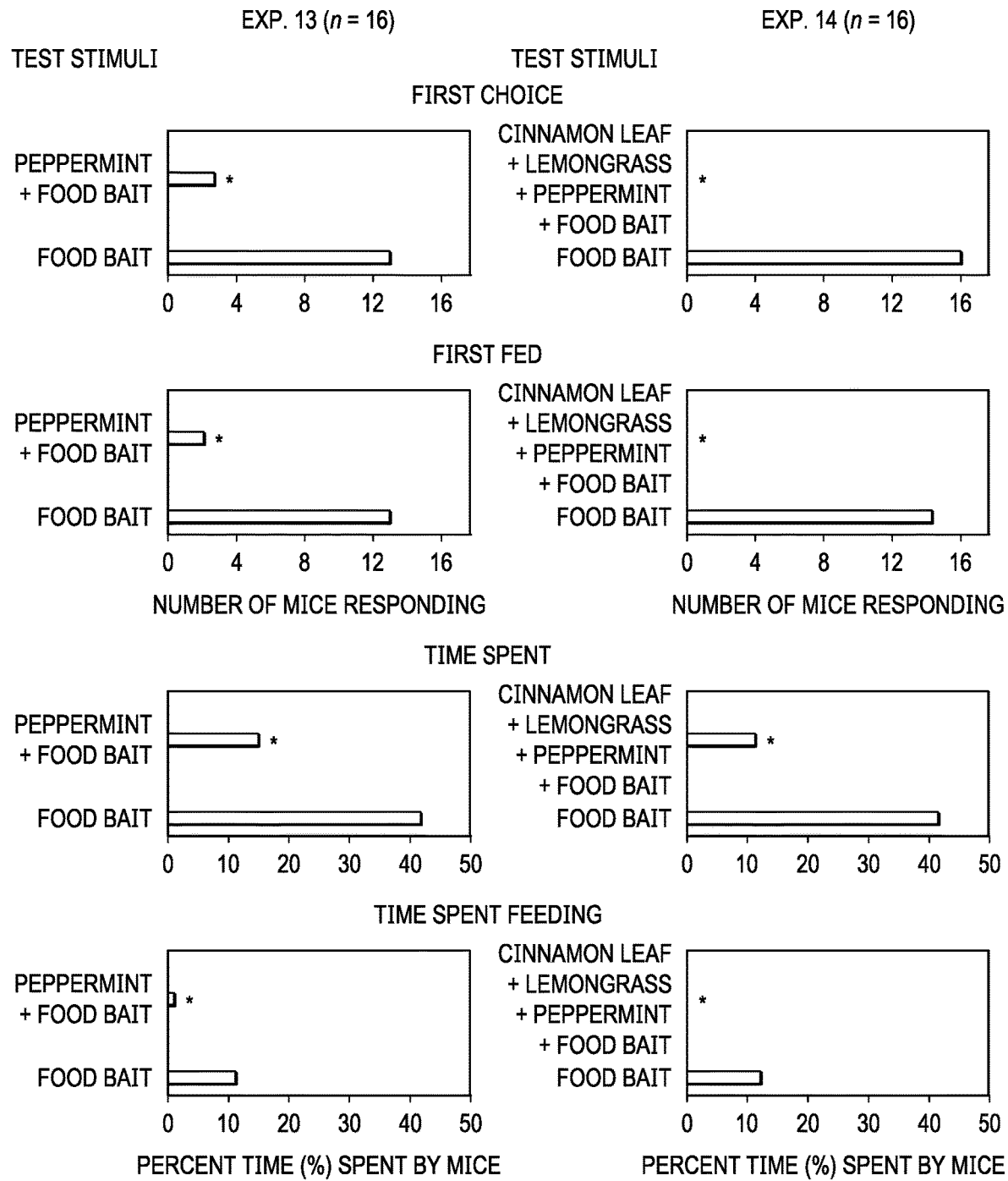
FIG. 4 depicts the first-choice, first-fed, and time-spent data for female mice responding to the choice of a chamber scented with certain mouse repellents versus a chamber not scented.

As depicted in FIG. 4, the ternary blend of peppermint, cinnamon leaf, and lemongrass tested in Experiment 14 had impressive deterrent effects on mice. The olfactometer chamber scented with this ternary blend was never entered first, the food bait in it was never fed on, and significantly less time was spent in this chamber by mice than in the corresponding unscented control chamber.

Experiment 15: Field Experiment to Test the Ability of the Ternary Blend of Peppermint, Lemongrass, and Cinnamon Leaf Oil to Deter Wild Mice from Entering Trap Boxes Baited with a Food Bait.

Figure 5:
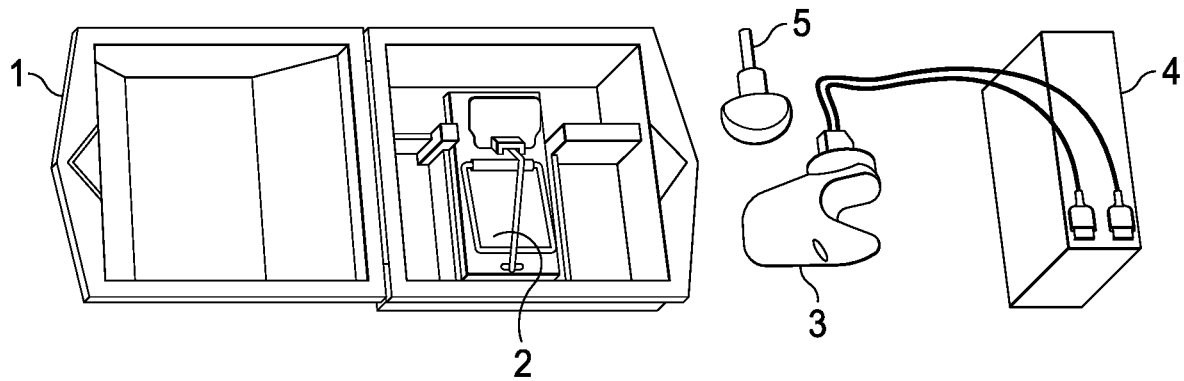
FIG. 5 depicts a trap box fitted with an electric fragrance oil dispenser and a battery designed to heat the dispenser reservoir for volatilization of the mouse repellents.

Based on the laboratory results of Experiment 14, the ability of the ternary blend of plant essential oils to repel mice was tested in a field experiment. In Experiment 15, 12 trap boxes were placed at 10-m spacing along the exterior walls of barns in Abbotsford, BC. As depicted in FIG. 5, six randomly assigned treatment boxes (1) were fitted with an electric fragrance oil dispenser (3) configured to heat to 40° C. by direct current from a 12-v battery (4). The dispenser reservoir (5) in treatment traps was filled with a 10-ml formulation consisting of mineral oil (7 ml) and a blend of three plant essential oils (peppermint, lemongrass, cinnamon leaf in 1:1:1 ratio of 1 ml each), whereas the dispenser reservoir (5) in control traps was filled with a 10-ml mineral oil control. Each trap box contained a Victor® snap trap (M325 M7 Pro mouse Woodstream® Co., Lancaster, PA 17602, USA) (2) that was set with a food bait identical to that of Experiments 1 to 14 which prompted feeding and thus capture of responding mice. Every 72 to 96 hours, all trap boxes were checked, reservoirs of dispensers replenished, and batteries replaced. Food baits were replaced weekly. Whenever a mouse had been captured, a new trap box and snap trap were deployed, thus ensuring that the odor of a captured mouse did not affect future captures.

Figure 6:
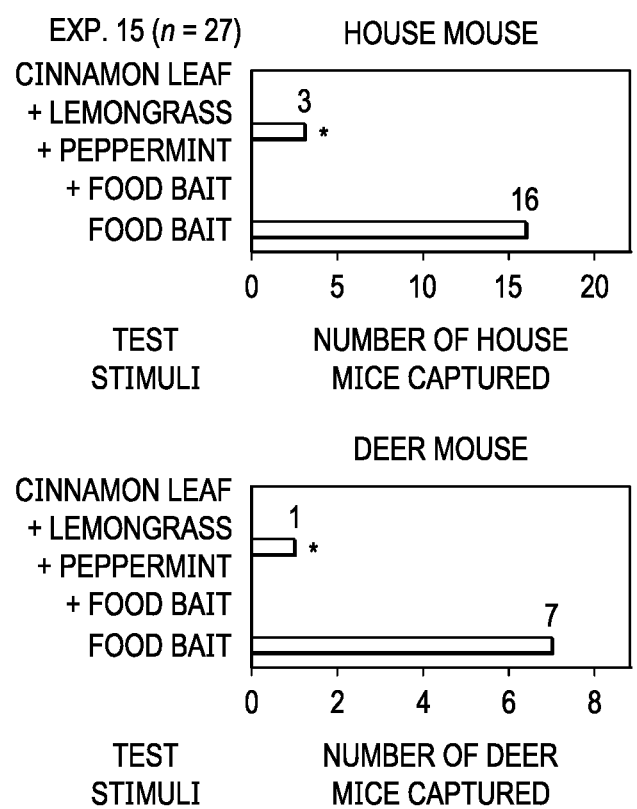
FIG. 6 depicts the number of house mice and deer mice captured in trap boxes that were scented (treatment), or not (control), with the mouse repellent consisting of a ternary blend of plant essential oils.

FIG. 6 depicts the number of house mice and deer mice captured in Experiment 15, with asterisks (*) indicating a statistically significant effect according to a g-test. As depicted by FIG. 6, trap boxes fitted with dispensers that released the ternary blend of peppermint, lemongrass and cinnamon leaf captured 5.75-times fewer house mice, and 7-times fewer deer mice, than unscented control boxes (house mice: 3 vs 16, g-test=9.7, P=0.002; deer mice: 1 vs 7, g-test=5.1, P=0.02).

The results of Experiment 15 indicate the strong deterrent effect of the mouse repellent consisting of a blend of peppermint, lemongrass, and cinnamon leaf. This is further bolstered by the original design of Experiment 15, where the treatment box and the control box were placed only 0.5 to 1 meter apart. In this original design, no captures were observed in either treatment or control boxes, suggesting that the mouse repellent effectively deterred mice over ranges greater than 1 meter.

As used herein, all percentages (%) are percent by weight of the total composition, also expressed as weight/weight %, % (w/w), w/w, w/w % or simply %, unless otherwise indicated. Also, as used herein, the terms "wet" refers to relative percentages of the composition in a dispensing medium (e.g., mineral oil); and "dry" refers to the relative percentages of the dry composition prior to the addition of the dispensing medium. In other words, the dry percentages are those present without taking the dispensing medium into account. Wet admixture refers to the composition with the dispensing medium added. "Wet weight percentage", or the like, is the weight in a wet mixture; and "dry weight percentage", or the like, is the weight percentage in a dry composition without the dispensing medium. Unless otherwise indicated, percentages (%) used herein are dry weight percentages based on the weight of the total composition.

The dimensions and values disclosed herein are not to be understood as being strictly limited to the exact numerical values recited. Instead, unless otherwise specified, each such dimension is intended to mean both the recited value and a functionally equivalent range surrounding that value.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross-referenced or related patent or patent application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in the document shall govern.

The foregoing description of embodiments and examples has been presented for purposes of description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent articles by those of ordinary skill in the art. Rather, it is hereby intended the scope be defined by the claims appended hereto.

What is claimed is:

1. A method of controlling mice comprising: dispensing a mouse repellent blend at a at least first location, and attracting mice to at a at least second location, and wherein the mouse repellent blend comprises one or more plant essential oils;
   wherein the one or more plant essential oils consists of a blend of peppermint, lemongrass, and cinnamon leaf.

2. The method of claim 1, wherein the one or more plant essential oils are isolated, purified, or synthetic.

3. The method of claim 1, wherein the mouse repellent blend further comprises plant-derived natural compounds selected from the group consisting of piperin, capsaicin, cayenne peppers, chili peppers, and black peppers.

4. The method of claim 1, wherein the plant essential oils are included in equal amounts by weight or volume.

5. The method of claim 1, wherein the mouse repellent blend further comprises a carrier liquid, wherein the one or more plant essential oils are disseminated from the carrier liquid.

6. The method of claim 5, wherein the carrier liquid comprises mineral oil.

7. The method of claim 6, wherein the mouse repellent blend comprises about 3 ml of the one or more plant essential oils or plant-derived natural compounds and about 7 ml of the carrier liquid.

8. The method of claim 1, wherein the mouse repellent blend further comprises one or more additional deterrents, bittering compounds, colorants, and rheology modifiers.

9. The method of claim 1, wherein dispensing the mouse repellent blend at the at least first location comprises dispensing the mouse repellent blend from a device for repelling one or more mice.

10. The method of claim 9, wherein the device comprises a heated chamber; wherein the mouse repellent blend is transferable to the heated chamber; and wherein dispensing the mouse repellent blend at the at least first location further comprises heating the heated chamber to a temperature suitable for controlled volatilization of the mouse repellent blend.

11. The method of claim 9, wherein the heated chamber is electrically heated.

12. The method of claim 9, wherein the mouse repellent blend is transferred into the heated chamber by a wick.

13. The method of claim 9, wherein the device is a plug-in device.

* * * * *